Sept. 15, 1936.  E. J. DRAKE  2,054,366
DISH STERILIZER AND DRIER
Filed Nov. 8, 1934
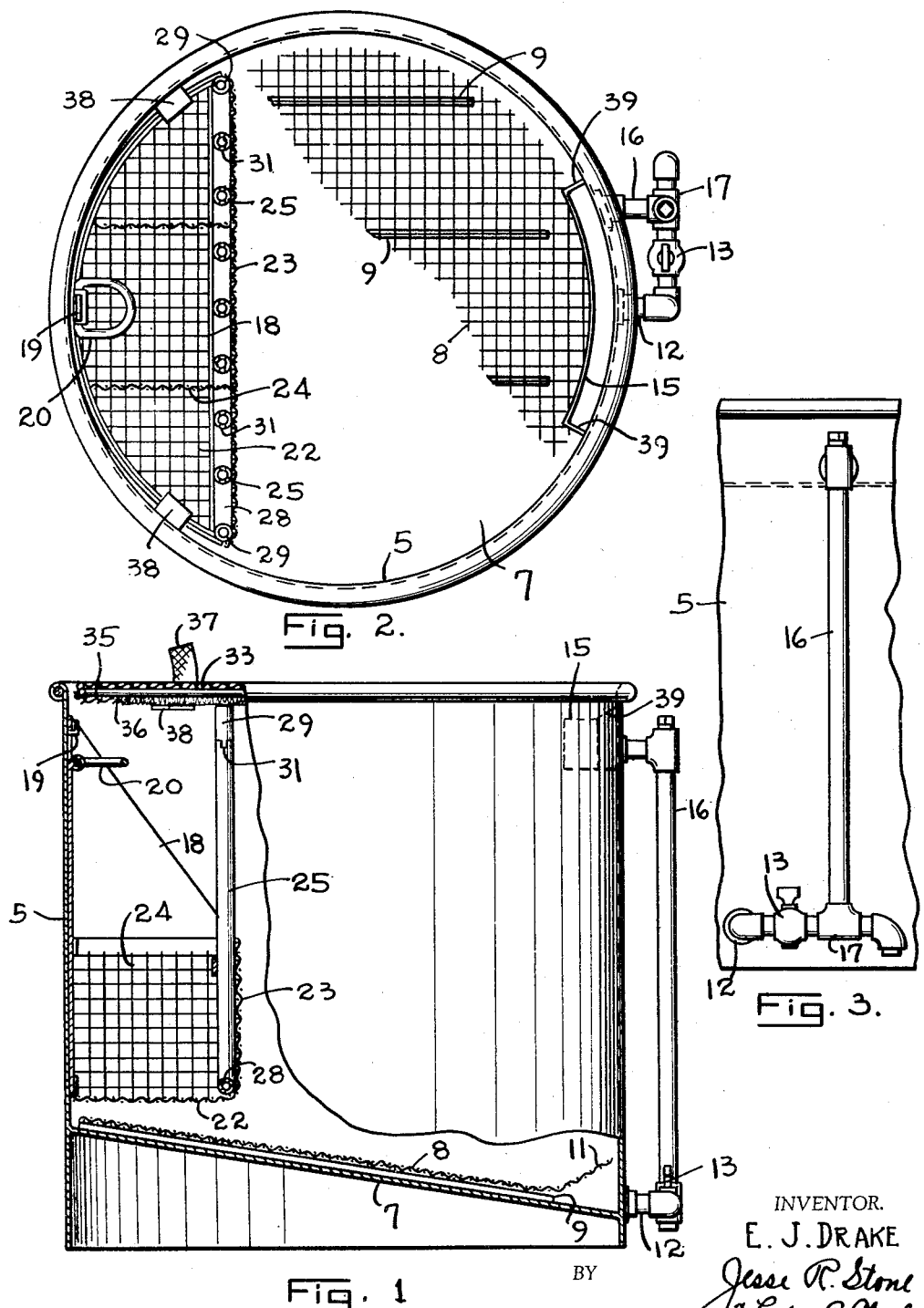
INVENTOR.
E. J. DRAKE
BY Jesse R. Stone
Lester B Clark
ATTORNEYS.

Patented Sept. 15, 1936

2,054,366

UNITED STATES PATENT OFFICE 2,054,366

DISH STERILIZER AND DRIER

Ethel J. Drake, Houston, Tex.

Application November 8, 1934, Serial No. 752,011

4 Claims. (Cl. 141—9)

The invention relates to an improved dish rinser, sterilizer and drier.

An object of the invention is to provide a suitable container in which the dishes and utensils may be rinsed, sterilized and dried.

Another object of the invention is to provide a receptacle into which dishes and utensils may be placed, and be rinsed and sterilized with hot water, the receptacle also providing a drying and storage space.

Another object of the invention is to provide a dish rinser and sterilizer in which the hot water rises over the dishes and floats the grease and dirt off the dishes and into an overflow drain.

Still another object of the invention is to provide a dish rinser wherein glasses are rinsed while in an inverted position, from which position the water readily drains.

A still further object of the invention is the provision of a rack for holding glasses, the rack comprising vent tubes permitting the escape of air from the inside of the glasses as the rinsing water rises thereabout.

Another object of the invention is to provide a dish rinsing and sterilizing container in which the dishes will dry quickly and which with a ventilating cover, forms a convenient storage cabinet for the dishes.

Still another object of the invention is to provide a removable basket for a dish rinser which is adapted to hold various articles of silverware and glasses in an inverted position.

These and other objects of the invention will be apparent when the following description is considered in connection with the accompanying drawing, wherein:

Fig. 1 is a front elevation of the invention, certain parts being broken away to show the details of construction.

Fig. 2 is a top plan view of the invention, the cover having been removed.

Fig. 3 is a side elevation of a portion of the device, showing the drain and overflow connections.

The cleaning of household or restaurant dishes usually involves the steps of washing, sterilizing and rinsing, drying and storing, and this invention has as its purpose the combining of the steps of sterilizing and rinsing, drying and storing.

The invention contemplates broadly the provision of a suitable container into which the articles to be rinsed, dried and stored are placed, sterilizing and rinsing the articles by filling the container with hot water and floating off foreign matter, and draining off the water so that the hot articles will evaporate the water on their surface.

It is not necessary to remove the articles for wiping or storage, the container being so constructed that all articles may be placed in it in a draining position, this being especially true of the glasses for which special provision is made.

The container or cabinet may be of any desired material or configuration and is shown in Figs. 1 and 2 as being of cylindrical form as at 5. A removable basket or receptacle such as 18 may be provided within the container 5 and be proportioned to occupy only part of the interior space. This basket is intended to receive the smaller articles and glasses, and the other dishes and utensils are placed in the remaining space.

The container proper has a bottom 7 which may be sloping as shown, and overlying the bottom is the screen or grill 8, preferably of rustproof material, which is supported by the ribs 9 and on which some of the dishes are stacked. The right hand end of the grill is inclined upwardly at 11 to protect the opening of the drain 12, which may be closed by the valve 13.

An overflow trough 15 is located in close proximity to the upper rim of the container 5 and has the discharge line 16 leading therefrom. The overflow line 16 and the drain 12 unite in the T 17 from which a suitable outlet is provided so that the water may be disposed of in any manner desired.

A particular feature of the invention is the basket or receptacle 18 which is adapted to fit within the container and is here shown as being removable and supported on the hook 19. A handle 20 is provided on the basket facilitating its removal and handling. The basket may be constructed with a perforated or screen wire bottom 22 and front 23, and is divided into compartments by the partitions 24. It is contemplated that articles such as knives, forks, and spoons may be kept separate in the various compartments of the basket.

A glass rack of novel construction is incorporated in the basket and includes a plurality of upstanding tubes 25 which are open at their upper ends and have their lower ends connected through the transverse tube 28 to the risers 29. Glasses to be rinsed, etc., are placed over the tubes 25 in an inverted position, and as the water level in the container rises, the air in the glasses escapes down through the tubes and out through the risers 29, permitting the water to enter the glasses freely. Any possibility of a seal between a glass and the top of a tube is eliminated by the provision of the slots 31 cut in the top of each tube.

It is contemplated that the tubes 25 are of such length that the top of a glass supported thereon will be beneath the level of the lip of the overflow trough 15, in order that the water in the container will completely cover all articles when it overflows. It is also contemplated that the risers 29 will be of such length as to extend above the level of the lip of the trough 15 so that the water will never cover the upper end of these tubes and seal them.

A suitable cover may be provided and is here shown as being constructed of the cloth 33 stretched around a wire loop 35 by an elastic cord such as 36. A tab 37 forms a convenient handle for the cover which rests on the two lugs 38 and the slanting ends 39 of the overflow trough 15.

A cloth cover has been found advantageous in that it permits free exit of steam from the sterilizing water and gives a substantially dust-tight closure to protect the dishes during the period that they are stored in the cabinet.

In operation, the dishes, etc., are first washed in the customary manner; then they are placed in the container, knives, forks and spoons in the basket, glasses on the tubes, and dishes and utensils in the remaining portions of the device. Water of gradually increasing temperature may then be poured or sprayed over the contents, either by hand or by means of a suitable hose and spray head, and may be conveniently obtained from the conventional household water heaters, where the cold water in the water pipe is gradually replaced by the hot water from the heater or reservoir. The addition of water in this manner avoids the danger of breakage.

When the water being added becomes hot, the drain valve is closed and the container filled with the hot water, and the grease, etc. is floated away by means of the overflow 15, and carried away.

It is desirable that the temperature of the water be raised to approximately the boiling point to give the best results. By opening the valve 13 the water is drained off and the water remaining on the dishes is quickly evaporated. The cover may be placed on the cabinet and the dishes left until the next meal.

In some cases it may be desirable to permit the washed dishes to accumulate before sterilizing and rinsing any of them and this is well within the scope of the invention.

The basket serves as a convenient device for carrying the silverware and glasses to the table for use, and thus serves to perform a double function.

What is claimed is:

1. A dish rinsing and drying cabinet including a substantially cylindrical receptacle, an overflow outlet adjacent the upper margin of the wall of said receptacle and a discharge pipe connected thereto, a hook on the wall of said receptacle opposite said overflow, a basket on said hook, a handle for said basket, a plurality of compartments in said basket to receive small articles, a plurality of upstanding tubes on said basket, said tubes extending upwardly from said basket whereby inverted glasses may be supported thereon, notches in the upper ends of said tubes, said tubes being joined at their lower ends by a vent pipe communicating with the atmosphere whereby air in the inverted glasses may be discharged therefrom as water rises in the glasses.

2. A basket for a dish-rinsing cabinet consisting of a hollow construction, which basket comprises a dish receiving compartment of substantial depth located at the lower end of said basket, hollow posts embodied in the side walls of said basket and extending above said compartment to form supports for drinking glasses, vent pipes embodied in the side walls of said basket and extending above said posts, and means connecting said vent pipes with said posts whereby air trapped in the glasses supported by said posts may escape through said posts and said pipes.

3. A basket for a dish-rinsing cabinet consisting of a hollow construction, which basket comprises a dish receiving compartment of substantial depth located at the lower end of said basket, means dividing said compartment into pockets, hollow posts embodied in the side walls of said basket and extending above said compartment to form supports for drinking glasses, said posts being of sufficient length to support the glasses above said compartment, vent pipes embodied in the side walls of said basket and extending above said posts, and means connecting said vent pipes with said posts whereby air trapped in the glasses supported by said posts may escape through said posts and said pipes.

4. A basket for a dish-rinsing cabinet consisting of a hollow construction, which basket comprises a dish receiving compartment of substantial depth located at the lower end of said basket, hollow posts embodied in the side walls of said basket and extending above said compartment to form supports for drinking glasses, said posts being of sufficient length to support the glasses above said compartment and being formed at their upper ends with lateral passages through which air may enter such parts from the interior of the glasses, vent pipes embodied in the side walls of said basket and extending above said posts, and means connecting said vent pipes with said posts whereby air trapped in the glasses supported by said posts may escape through said posts and said pipes.

ETHEL J. DRAKE.